US010262346B2

(12) United States Patent
Glass et al.

(10) Patent No.: US 10,262,346 B2
(45) Date of Patent: Apr. 16, 2019

(54) SYSTEM AND METHOD FOR A MERCHANT ONSITE PERSONALIZATION GIFTING PLATFORM

(71) Applicant: GIFT CARD IMPRESSIONS, LLC, Kansas City, MO (US)

(72) Inventors: Brett R. Glass, Kansas City, MO (US); Elizabeth Ann Trimble, Kansas City, MO (US); Mark Steiner, Kansas City, MO (US)

(73) Assignee: Gift Card Impressions, Inc., Kansas City, MO (US)

( * ) Notice: Subject to any disclaimer, the term of this patent is extended or adjusted under 35 U.S.C. 154(b) by 0 days.

(21) Appl. No.: 14/456,707

(22) Filed: Aug. 11, 2014

(65) Prior Publication Data
US 2015/0317711 A1   Nov. 5, 2015

Related U.S. Application Data

(63) Continuation of application No. 14/266,276, filed on Apr. 30, 2014, now abandoned.

(51) Int. Cl.
*G06Q 20/06* (2012.01)
*G06Q 30/06* (2012.01)
(Continued)

(52) U.S. Cl.
CPC ......... *G06Q 30/06* (2013.01); *G06Q 30/0241* (2013.01); *G06Q 30/0601* (2013.01);
(Continued)

(58) Field of Classification Search
CPC combination set(s) only.
See application file for complete search history.

(56) References Cited

U.S. PATENT DOCUMENTS

| 4,611,262 A | 9/1986 | Galloway et al. |
| 4,703,573 A | 11/1987 | Montgomery et al. |

(Continued)

FOREIGN PATENT DOCUMENTS

EP   0 596 171 A1   5/1994

OTHER PUBLICATIONS

U.S. Appl. No. 13/273,220 Office Action dated Oct. 27, 2014 (8 pages).

(Continued)

*Primary Examiner* — Nicholas D Rosen
(74) *Attorney, Agent, or Firm* — Erise IP, P.A.

(57) ABSTRACT

An online personalized gifting system and method includes an application executed on a computing device to communicate with a merchant server owned and managed by a merchant for generating customized gift structures that may be sent to a recipient. The application transmits the gift structure templates to a merchant server in communication with a user computing device, communicates with the merchant server to receive a selected one gift structure template that has been obtained by the merchant server from the user computing device, and communicate with the merchant server to receive at least one of user-supplied textual, audio, or video content that has been obtained by the merchant server from the user computing device. The application communicates with a production facility located at a site of the merchant to generate a gift structure in accordance with the selected gift structure template and the user-supplied content using a production facility.

20 Claims, 14 Drawing Sheets

(51) Int. Cl.
  *G06Q 30/02* (2012.01)
  *G06Q 50/04* (2012.01)
(52) U.S. Cl.
  CPC ......... *G06Q 30/0621* (2013.01); *G06Q 50/04*
       (2013.01); *Y02P 90/30* (2015.11)

(56) References Cited

U.S. PATENT DOCUMENTS

| | | | |
|---|---|---|---|
| 5,063,698 | A | 11/1991 | Johnson et al. |
| 5,251,251 | A | 10/1993 | Barber et al. |
| 5,425,078 | A | 6/1995 | Stern |
| 5,444,767 | A | 8/1995 | Goetscheus et al. |
| 5,490,206 | A | 2/1996 | Stern |
| 5,513,117 | A | 4/1996 | Small |
| 5,570,414 | A | 10/1996 | Stern |
| 5,652,606 | A | 7/1997 | Sasaki et al. |
| 5,719,920 | A | 2/1998 | Harman |
| 6,288,319 | B1 | 9/2001 | Catona |
| 6,356,626 | B1 | 3/2002 | Ohara et al. |
| 6,573,880 | B1 | 6/2003 | Simoni et al. |
| 6,666,378 | B2 | 12/2003 | Davila et al. |
| 6,850,248 | B1 | 2/2005 | Crosby et al. |
| 6,965,912 | B2 | 11/2005 | Friedman et al. |
| 7,127,841 | B1 | 10/2006 | Weber |
| 7,152,350 | B2 | 12/2006 | Youngdahl et al. |
| 7,203,287 | B2 | 4/2007 | Turner et al. |
| 7,216,092 | B1 | 5/2007 | Weber et al. |
| 7,222,797 | B2 | 5/2007 | Davila et al. |
| 7,356,950 | B1 | 4/2008 | Avery |
| 7,359,954 | B2 | 4/2008 | Friedman et al. |
| 7,370,076 | B2 | 5/2008 | Friedman et al. |
| 7,478,143 | B1 | 1/2009 | Friedman et al. |
| 7,535,996 | B2 | 5/2009 | Turner |
| 7,606,857 | B2 | 10/2009 | Friedman et al. |
| 7,711,620 | B2 | 5/2010 | Abifaker |
| 7,797,378 | B2 | 9/2010 | Friedman et al. |
| 7,802,386 | B2 | 9/2010 | Mandelbaum et al. |
| 7,953,654 | B2 | 5/2011 | Abifaker |
| 7,959,065 | B2 | 6/2011 | Rosenblatt et al. |
| 7,967,215 | B2 | 6/2011 | Kumar |
| 7,975,927 | B1 | 7/2011 | Whitney |
| 8,011,122 | B2 | 9/2011 | Clegg |
| 8,046,266 | B1 | 10/2011 | Geller |
| 8,280,825 | B2* | 10/2012 | Friedman ........... G06Q 30/0601 705/26.1 |
| 8,589,314 | B2* | 11/2013 | Friedman ............... G06Q 30/02 705/26.1 |
| 2001/0040560 | A1 | 11/2001 | Amron |
| 2001/0043164 | A1 | 11/2001 | Thagard et al. |
| 2001/0043194 | A1 | 11/2001 | Amron |
| 2002/0118948 | A1 | 8/2002 | Jones |
| 2003/0191655 | A1* | 10/2003 | Janz .................... 705/1 |
| 2003/0192209 | A1 | 10/2003 | Yeh |
| 2004/0150983 | A1 | 8/2004 | Sexton et al. |
| 2004/0167819 | A1 | 8/2004 | Keating |
| 2004/0205138 | A1* | 10/2004 | Friedman et al. ............ 709/206 |
| 2004/0217877 | A1 | 11/2004 | Kokonaski et al. |
| 2004/0248073 | A1 | 12/2004 | Pinkerman et al. |
| 2005/0004878 | A1 | 1/2005 | Malone |
| 2005/0144034 | A1* | 6/2005 | Hunter ................ B29C 45/0084 36/44 |
| 2005/0270280 | A1 | 12/2005 | Riback et al. |
| 2006/0015359 | A1 | 1/2006 | Merritt |
| 2006/0080539 | A1* | 4/2006 | Asami ..................... G06F 21/34 713/182 |
| 2006/0134591 | A1 | 6/2006 | Karat |
| 2006/0184386 | A1 | 8/2006 | Merritt |
| 2007/0038577 | A1 | 2/2007 | Werner et al. |
| 2007/0080214 | A1 | 4/2007 | Collas et al. |
| 2007/0143133 | A1 | 6/2007 | Velcoff |
| 2007/0153638 | A1 | 7/2007 | Lebbing |
| 2007/0169387 | A1 | 7/2007 | Glass |
| 2007/0171278 | A1 | 7/2007 | Chen |
| 2007/0282697 | A1 | 12/2007 | Kirby |
| 2007/8028426 | | 12/2007 | Star |
| 2008/0099551 | A1 | 5/2008 | Harper et al. |
| 2008/0116088 | A1 | 5/2008 | Roberts |
| 2008/0119952 | A1 | 5/2008 | Smith et al. |
| 2008/0189368 | A1 | 8/2008 | Rothschild |
| 2008/0249657 | A1* | 10/2008 | Wendland .............. G06Q 30/00 700/235 |
| 2008/0289230 | A1 | 11/2008 | Mandelbaum et al. |
| 2009/0027566 | A1 | 1/2009 | Wargon |
| 2009/0030694 | A1 | 1/2009 | Stern |
| 2009/0070213 | A1 | 3/2009 | Miller et al. |
| 2009/0138396 | A1 | 5/2009 | Boal |
| 2009/0171804 | A1 | 7/2009 | Lee |
| 2009/0187491 | A1 | 7/2009 | Bull |
| 2009/0211126 | A1 | 8/2009 | Oh |
| 2009/0216653 | A1 | 8/2009 | Sanguinetti et al. |
| 2009/0254453 | A1 | 8/2009 | Sanguinetti et al. |
| 2009/0238544 | A1 | 9/2009 | Orsini |
| 2009/0281794 | A1 | 11/2009 | Avraham et al. |
| 2010/0004935 | A1 | 1/2010 | Wain |
| 2010/0005377 | A1 | 1/2010 | Batan |
| 2010/0007897 | A1* | 1/2010 | Kim ..................... G06F 3/1205 358/1.2 |
| 2010/0011632 | A1 | 1/2010 | Shields et al. |
| 2010/0017278 | A1 | 1/2010 | Wilen et al. |
| 2010/0049632 | A1* | 2/2010 | Friedman ............... G06Q 30/02 705/26.1 |
| 2010/0052876 | A1 | 3/2010 | Clegg |
| 2010/0052934 | A1 | 3/2010 | Clegg |
| 2010/0174618 | A1 | 7/2010 | Driessen |
| 2010/0175287 | A1 | 7/2010 | Gupta et al. |
| 2010/0250255 | A1 | 9/2010 | Stern |
| 2011/0054906 | A1 | 3/2011 | Stern |
| 2011/0125607 | A1 | 5/2011 | Wilen |
| 2011/0145698 | A1 | 6/2011 | Penov et al. |
| 2011/0153462 | A1 | 6/2011 | Granich |
| 2011/0210160 | A1 | 9/2011 | Ventieghem |
| 2011/0213675 | A1* | 9/2011 | Friedman ............... G06Q 30/02 705/26.7 |
| 2012/0123895 | A1* | 5/2012 | Horvitz ...................... 705/26.5 |
| 2012/0271732 | A1* | 10/2012 | Glass et al. .................. 705/26.5 |
| 2013/0304605 | A1* | 11/2013 | Glass ................. G06Q 30/0621 705/26.5 |
| 2014/0006263 | A1* | 1/2014 | Townsend ............... G06T 11/60 705/39 |
| 2014/0279187 | A1* | 9/2014 | Gopinath ............... G06Q 50/01 705/26.7 |
| 2014/0279205 | A1* | 9/2014 | Ganesh ................. G06Q 50/01 705/26.7 |
| 2015/0220856 | A1* | 8/2015 | Yaros .................. G06Q 10/063 705/7.12 |

OTHER PUBLICATIONS

U.S. Appl. No. 13/273,220 Office Action dated Jul. 14, 2014 (9 pages).
U.S. Appl. No. 13/273,220 Office Action dated Jan. 7, 2014 (25 pages).
U.S. Appl. No. 13/273,220 Office Action dated Aug. 21, 2013 (53 pages).
PCT/US13/23945 International Search Report and Written Opinion (15 pages).
www.GiftCardImpressions.com. Jul. 6, 2008 to Oct. 13, 2008. [recovered from www.Archive.org] (4 pages).

* cited by examiner

MERCHANT WEBSITE
Sign In

E-mail: ☐

Password: ☐

Sign In

Fig. 16

MERCHANT WEBSITE
Register New Account
"Creating an account will save your
billing address for future purchases."

◀ Back   Register   Continue ▶
Checkout as Guest

Fig. 17

MERCHANT WEBSITE

Recipient Information

Name: [                    ]

E-mail: [                    ]

Message ▼

◀ Back          Continue ▶

Fig. 18

MERCHANT WEBSITE

Recipient Information

Recipient Location: [                    ]

Recipient Age: [                    ]

3 Likes/Interests: [                    ]

Naughty? Why? [                    ]

◀ Back          Continue ▶

Fig. 19

SYSTEM AND METHOD FOR A MERCHANT ONSITE PERSONALIZATION GIFTING PLATFORM

RELATED APPLICATIONS

This application is a continuation of non-provisional patent application Ser. No. 14/266,276, filed Apr. 30, 2014, entitled "System and Method For a Merchant Onsite Personalization Gifting Platform." The contents of Ser. No. 14/266,276 are incorporated by reference in its entirety.

FEDERALLY SPONSORED RESEARCH OR DEVELOPMENT

Not Applicable.

COMPACT DISK APPENDIX

Not Applicable.

FIELD

The present document relates to gifting systems, and more particularly, to a system and method for a merchant onsite personalization gifting platform.

BACKGROUND

Gifts are often used to show gratitude and/or convey a sentiment from a giver to his or her recipient. For example, gift structures, such as greeting cards are gifting devices that include short messages, which are typically used to convey an emotional sentiment or commemorate a special occasion (e.g., a birthday, Christmas, or other holiday), from a giver of the greeting card to its recipient. Greeting cards typically include a sheet of folded card stock on which one or more messages are printed. Nevertheless, greeting cards may also include other types of messages other than printed messages, such as pop-outs that mechanically expand as the greeting card is opened, and multimedia devices (e.g., sound generating devices and/or video generating devices).

Although greeting cards have been proven to provide a relatively good gifting mechanism, merchandizers who provide products and/or services for customers have not heretofore been able to fully capture the greeting card's capability for use with their customers. For example, the level and types of products and/or services provided by merchants as well as the level and type of the merchants' customers is constantly changing over time. In order for the merchant to convey an appropriate sentiment therefore, the subject matter and content of messages included in these greeting cards must also dynamically change as their customer base and product/service offerings change. Nevertheless, many merchants do not have sufficient expertise in greeting card design to implement their own greeting card offerings to their consumers. Additionally, the logistics associated with the manufacture and distribution of greeting cards may be cost prohibitive for many merchants. It is with these problems in mind, among others, that embodiments of the present disclosure have been developed.

SUMMARY

According to one aspect of the disclosure, a merchant onsite personalization gifting system and method includes an application executed on a computing device to communicate with a merchant server owned and managed by a merchant for generating customized gift structures that may be sent to a recipient. The application transmits the gift structure templates to a merchant server in communication with a user computing device, communicates with the merchant server to receive a selected one gift structure template that has been obtained by the merchant server from the user computing device, and communicate with the merchant server to receive at least one of user-supplied textual, audio, or video content that has been obtained by the merchant server from the user computing device. Using this information, the application communicates with a production facility located at a site of the merchant to generate a gift structure in accordance with the selected gift structure template and the user-supplied content using a production facility. The production facility is configured to facilitate transferal of the gift structure to a recipient selected by the user computing device.

According to another aspect, a gift structure ordering method includes transmitting a plurality of gift structure templates to a merchant server in communication with a user computing device in which each gift structure template has one or more user-supplied content fields for inclusion of user-supplied content, and communicating with the merchant server to receive a selected one gift structure template that has been obtained by the merchant server from the user computing device. The method further includes communicating with the merchant server to receive user-supplied content that has been obtained by the merchant server from the user computing device, communicating with a production facility located at a site of the merchant to generate a gift structure in accordance with the selected gift structure template and the user-supplied content using a production facility. The production facility may then include the user-supplied content in the user-supplied content fields of the gift structure template, and transfer the gift structure to a recipient selected by the user computing device.

According to yet another aspect, executable software code is configured to transmit a plurality of gift structure templates to a merchant server in communication with a user computing device in which each gift structure template has one or more user-supplied content fields for inclusion of user-supplied content, and communicate with the merchant server to receive a selected one gift structure template that has been obtained by the merchant server from the user computing device. The executable code is further configured to communicate with the merchant server to receive user-supplied content that has been obtained by the merchant server from the user computing device, and communicate with a production facility located at a site of the merchant to generate a gift structure in accordance with the selected gift structure template and the user-supplied content using a production facility. The production facility may then include the user-supplied content in the user-supplied content fields of the gift structure template, and transfer the gift structure to a recipient selected by the user computing device.

BRIEF DESCRIPTION OF THE DRAWINGS

FIG. 16 illustrates an example of a sign-in screen according to an aspect of the merchant onsite personalization gifting system.

FIG. 17 illustrates an example of a registration screen according to an aspect of the merchant onsite personalization gifting system.

FIG. 18 illustrates an example of a recipient information screen according to an aspect of the merchant onsite personalization gifting system.

FIG. 19 illustrates an example of another recipient information screen according to an aspect of the merchant onsite personalization gifting system.

DETAILED DESCRIPTION

Although gift structures, such as greeting cards have become a commonly accepted gifting mechanism, their use has not been optimized for use by merchants that offer gifting platforms for their products or services that they sell. For example, merchants often readily promote the use of gift cards because these gift cards ensure loyalty (e.g., the gift card recipient is often times restricted to redeeming the gift card at the merchant's establishment). Nevertheless, implementing a personalized gift structure gifting system to be used with gifting platforms for use by merchants has been generally difficult to establish. Embodiments of the present disclosure provide a solution to this problem, among others, using a merchant onsite personalized gifting platform that communicates with a merchant's online computing system to facilitate the creation, customization, and distribution of gift structures via a computing system of the merchant. Additionally, the system provides for inclusion of any of a number of different types of gifts to be sent along with each personalized gift structure to its recipient.

Figure 1A:
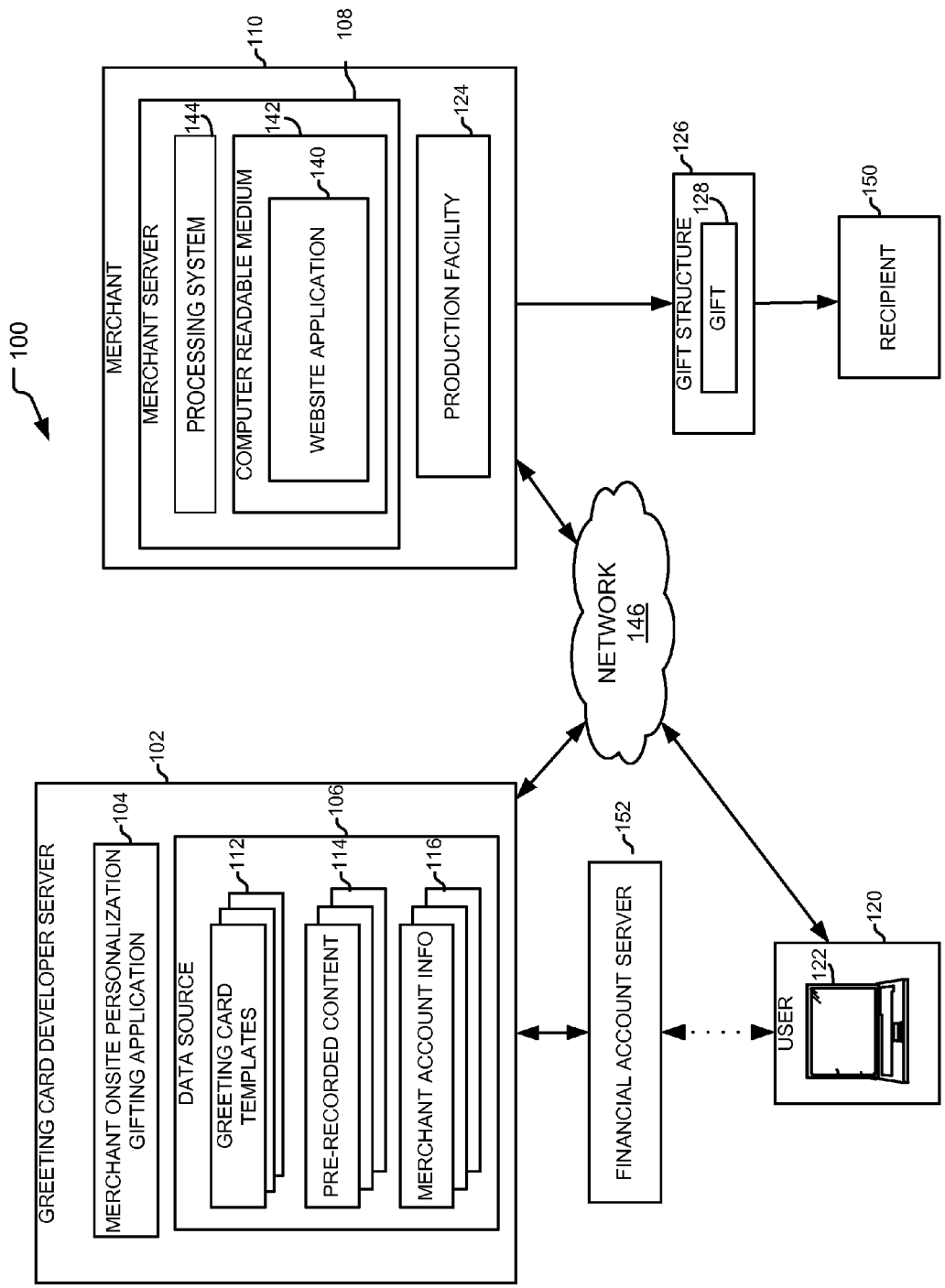
FIG. 1A is a block diagram of a computing system that includes a merchant onsite personalization gifting system according to an aspect of the merchant onsite personalization gifting system.
Figure 1B:
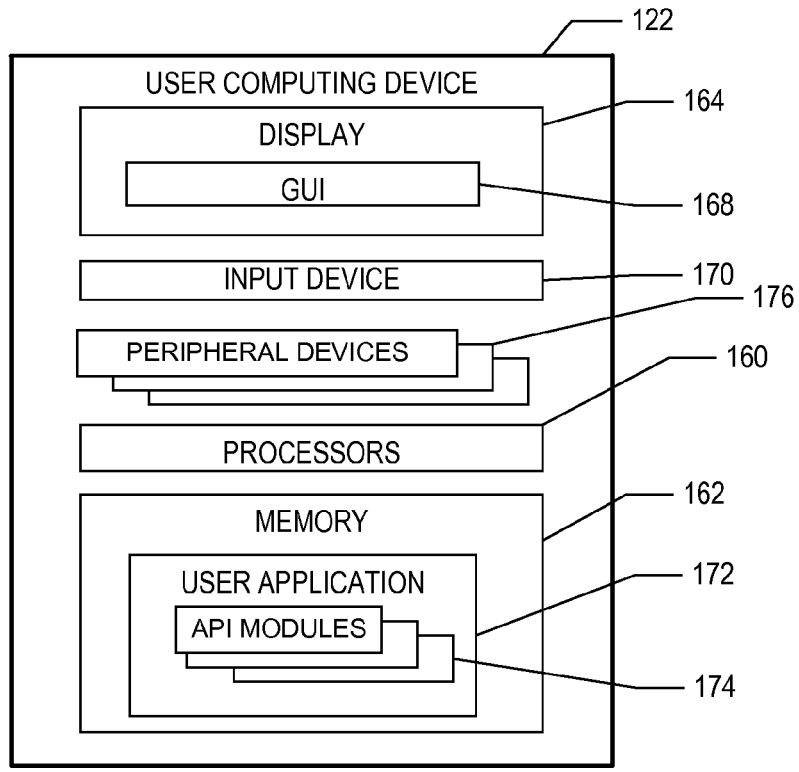
FIG. 1B depicts an exemplary embodiment of a user computing device according to one aspect of the merchant onsite personalization gifting system.
Figure 1C:
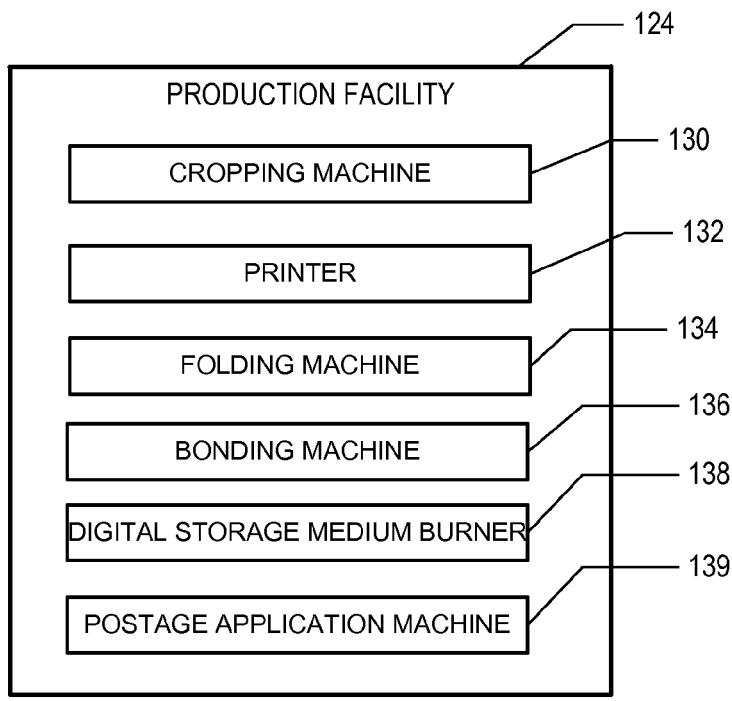
FIG. 1C depicts an exemplary embodiment of a production facility according to an aspect of the merchant onsite personalization gifting system.

FIGS. 1A through 1C depict an example merchant onsite personalization gifting system 100 according to aspects of the disclosure. The system 100 includes a gift structure developer server 102 that includes a merchant onsite personalization gifting application 104 and a data source 106. According to embodiments of the present disclosure, the merchant onsite personalization gifting application 104 communicates with a merchant server 108 owned and managed by a merchant 110 to receive selection of one gift structure template from among multiple gift structure templates 112 selected by a user (e.g., customer) 120 using a user computing device 122 and communicates with a production facility 124 located at a site of the merchant 110 to facilitate generation of a gift structure 126 in accordance with the selected gift structure template 112 and the user-supplied content.

The gift structure 126 may be any structure that is used for gifting purposes. Examples of such structures include, but are not limited to, greeting cards, gift card holders, flower bouquets, chocolate boxes, photobooks, gift boxes, and the like. The production facility 124 includes one or more components for fabricating the gift structures 126 that may then be sent to a recipient. For example, the production facility 124 includes a cropping machine 130 for cutting a sheet of cardstock or other type of printable medium into a size specified by the selected gift structure template 112. The production facility 124 also includes a printer 132 for printing one or more messages on the outside and inside surfaces of the cropped sheet of paper, a folding machine 134 for creating one or more fold lines in the cropped sheet of paper, a bonding machine 136 for gluing certain edges formed in a the cardstock for creating a box-like structure, a digital storage medium burner 138 for generating and/or otherwise configuring multimedia storage/playing devices to be configured on the selected gift structure 126, and a postage application machine 139 for applying any postage necessary to be sent to the recipient using a suitable mail delivery service.

The application 104 communicates with the cropping machine 130, printer 132, folding machine 134, digital storage medium burner 138, and/or postage application machine 139 in any suitable manner to facilitate creation of gift structures 126. The application also communicates with the merchant server 108 to facilitate a transaction for purchasing a gift 128 and including the gift 128 with the gift structure 126 to be sent to the recipient 150. In one embodiment, the cropping machine 130, printer 132, folding machine 134, digital storage medium burner 138, and/or postage application machine 139 may include an Ethernet interface for receiving instructions directly from the application 104 over a network 146. In another embodiment, either of the cropping machine 130, printer 132, folding machine 134, digital storage medium burner 138, and/or postage application machine 139 may receive instructions from the application 104 via a hardware controller, such as a general purpose interface bus (GPIB) controller that communicates with the application 104 using an Ethernet protocol, and communicates with the devices using an Institute of Electrical and Electronics Engineers (IEEE-488) protocol.

The multimedia storage/playing devices may include any type of device that stores and/or otherwise plays multimedia content, such as audio or video content to be included with the gift structure 126. For example, a multimedia storage/play device may include a storage medium, such as a universal serial bus (USB) memory stick or a compact disk (CD) storage device. The multimedia storage/play device may also include components for playing the multimedia content, such as a speaker for playing audio content or a display for displaying photographic imagery and/or video content.

Embodiments of the present disclosure providing a production facility 124 at the site of the merchant provide advantages not heretofore recognized with conventional gift structure creation/distribution platforms. For example, embodiments of the merchant onsite personalization gifting system provide the ability to create customized gift structures at a merchant site that are instantaneously available for inclusion with gifts, such as gift cards, or other purchased gift items (e.g., clothing, sporting equipment, trinkets, party gifts, and the like) that are shipped from the merchant site to their respective recipients. Additionally, components of the production facility are owned and maintained by the gift structure developer and are thus well suited for creating gift structures from the gift structure templates generated by the gift structure developer. As yet another advantage, the merchant may leverage the expertise of gift structure developers who are skilled in designing, creating, and distributing gift structures, thus freeing the merchant from this burdensome task, while being provided with a useful customer marketing tool via the use of customized gift structures.

The merchant 110 is an entity, such as a mail order retailer, or processing center of the merchant or other entity that processes incoming orders for products and fulfills these orders by managing shipment of the ordered product to recipients and payment for the ordered products from users. The merchant server 108 may execute any type of system that interacts with the user computing system 122 for displaying information associated with gift structures available for purchase, receiving information from the user computing device 122 for customizing a selected gift structure according to the user's specifications, and conducting a financial transaction for purchasing the customized gift structure to be sent to a recipient 150. The website application 140 may be provided to a computing device 122 of the user for interactively displaying gift structure information for view by the user 120 and receiving selection of gift structure information and/or user-supplied content to be included in the gift structure. In one aspect, the website application 140 may display and receive other forms of information from the user computing device 122, such as selection of a gift (e.g., gift card or other physical gift item) to be included with the generated gift structure 126.

One or more gifts 126 may be selected for inclusion with the gift structure that is sent to the recipient. Examples of suitable types of gifts includes, but are not limited to gift cards, event tickets, music subscriptions, flower bouquets, gift baskets, and one or more boxes of cookies, chocolates, candy, and the like. For example, a merchant that sells boxes of cookies as gifts may use the system 100 to allow users of their website to personalize a gift structure to be sent along with a selected box of cookies to a recipient. Additionally, the system 100 allows for the inclusion of various forms of user-supplied content with the selected box of cookies, such as a gift structure that include one or more photographs and/or text messages supplied by the user that are included on the personalized gift structure. The system 100 also allows for the inclusion of multi-media content, such as audio, photographic, and/or video content to be included with the gift structure via a memory device (e.g., a USB stick or other computer readable media) included with the gift structure. The greeting may also include a playback device, such as an audio player and/or a video player such that the recipient may consume the multi-media content directly from the gift structure.

The website application 140 is stored in a computer readable medium 142 and executed by a processing system 144 that may include one or more processors. Examples of such a system include one or more servers, personal computers, mobile computers and/or other mobile devices, and other computing devices. The merchant server 108 may communicate via wireless, wireline, and/or optical communications.

Generally, the website application 140 includes various features common to a website associated with a merchant, such as advertisements of various consumer items offered for sale by the merchant, store locations, store hours, and the like. For example, while browsing the website application 140 by the user computing device 122, if the user wishes to generate and send a customized gift structure 126 to a recipient 150, he or she may navigate to a certain webpage of the website application 140 in which that webpage, transparently to the user, transmits requests to the application 104 for obtaining gift structure information, such as the various types of gift structure templates available for customization and purchase.

In one embodiment, the merchant server 108 includes a website application 140 that facilitates interaction with the user computing device 122. In one embodiment, the application 104 exposes one or more application program interfaces (APIs) to the website application 140 for providing the features of the onsite personalization gifting system 100 described herein. In another embodiment, the application 104 is implemented in a service oriented architecture (SOA) such that the website application 140 accesses the features of the application 104 as independently functioning services conforming to a web services description language (WSDL) protocol. Nevertheless, any suitable type communication protocol between the website application 140 and the application 104 may be used for facilitating the gift structure generation platform.

The application 104 communicates with a financial account server 152 that is associated with a financial account of the user to provide payment for the gift structure and any gift to be associated with the purchased gift structure. The financial account is any type, such as a credit card account, a debit card account, or a PAYPAL™ account of the user. The application 104 facilitates a financial transaction between the merchant server 108 and the financial account server 152 associated with the user to provide payment for the gift structure. In other embodiments, the application 104 may facilitate the financial transaction between the financial account server 152 and a third party server of a third party stored value card activation service, such as INCOMM™, SVS™, FIRST DATA™, and STORE FINANCIAL™ stored value card activation services. The financial account server 152 and components of the production facility 116 have one or more processors and executable instructions stored in volatile and/or non-volatile memory for performing the actions and/or steps described herein.

The data source 106 stores gift structure templates 112, pre-recorded content 114, and merchant account information 116. The gift structure templates 112 include information that represents certain elements of a gift structure and may include one or more editable fields for entry of user-supplied content by the user. For example, one gift structure template may include information associated with a standardized gift structure shell having decorative front cover indicia for a special occasion with editable fields for the inner surface of the gift structure for customization of the gift structure by entry of user-supplied content, or for selection of pre-recorded content stored in the pre-recorded content 114. Additional details related to customization of the gift structure are described in U.S. patent application Ser. No. 13/273,220, filed Jul. 12, 2013, and entitled "Online Personalized Gifting System," which is hereby incorporated herein by reference in its entirety.

The user-supplied content may include any suitable type, such as textual content, audio content, photographs, video content and the like. In other embodiments, the data source 106 stores any type of information for customizing the gift structure by the user. Although the data source 106 is shown as being located on, at, or within the server 102, it is contemplated that the data source 106 can be located remotely from the server 102 in other aspects of the system 100, such as on, at, or within a database of a data management system or a database of another computing device or system having at least one processor and volatile and/or non-volatile memory.

The communication network 146 can be the Internet, an intranet, or another wired and/or wireless communication network. In one aspect, one or more of the server 102 and the merchant server 108 communicate with one another using any suitable protocol or messaging scheme. For example, the server 102 and merchant server 108 communicate using a Hypertext Transfer Protocol (HTTP), extensible markup language (XML), extensible hypertext markup language (XHTML), or a Wireless Application Protocol (WAP) protocol. Other examples of communication protocols exist.

The merchant onsite personalization gifting application 104 provides a mechanism for generating a gift structure 126 that includes personalized content by uploading one or more photographs, customized text messages such as a greeting, add pre-recorded songs and/or sound or voice messages and include this content with the gift structure 126. The user accesses the system 100 via the merchant server 108 hosted by the merchant 110 using an HTML link or other suitable entry point, such as through application software (i.e., a mobile app) executed on a portable computing device, such as a wireless communication device. The merchant onsite personalization gifting application 104 then either transmits this information to a production facility 116 where the physical gift card is fabricated according to the received information, and subsequently sent to the recipient, or generates a digital gift structure 126, and gift 128, such as a digital gift card, combination that is digitally transmitted to the recipient using an e-mail message, a short message service (SMS), via a social media account, or other suitable digital communication medium.

FIG. 1B depicts an example embodiment of a user computing device 122 according to one aspect of the merchant onsite personalization gifting system 100. The user computing device 122 is a computing or processing device that includes one or more processors 160 and memory 162. For example, the computing device 122 can be a personal computer, such as a laptop or notebook computer, a workstation, or other processing device such as a personal digital assistant, a mobile telephone, or a tablet computer. The computing device 122 includes a display 164, such as a computer monitor, for displaying data and/or a graphical user interface 168. The computing device 122 also includes an input device 170, such as a keyboard or a pointing device (e.g., a mouse, trackball, pen, or touch screen) to enter data into or interact with the graphical user interface 168. In one embodiment, the display 164 comprises a touch-screen device in which input is provided via contact by the user with the touch-screen device. The computing device 122 receives data and/or communications from, and/or transmit data and/or communications to, the merchant server 108 via the communication network 146.

The computing device 122 includes a user application 172 stored in the memory 162 and executed on the processors 160 to generate the graphical user interface (GUI) 168 to the display 164. The graphical user interface 168 enables the computing device 122 to interact with one or more data entry forms received from the website application 140 to enter order detail data and submit orders to the application 104. In one embodiment, the user application 172 includes a web browser that displays interactive web pages, applets, or other suitable user interface mechanisms including one or more selectable fields, editing screens, and the like for selecting content and/or modifying pre-recorded content by the user (i.e., sender). In another embodiment, the GUI application 172 includes application software (i.e., a mobile app) that is executed on the computing device 122, which is, for example, a wireless communication device for providing one or more selectable fields, edit screens, and the like for selecting content and/or modifying pre-recorded content by the user.

In one embodiment, the user application 172 also includes one or more application program interface (API) modules 174 for communicating with one or more peripheral devices 176 configured in the user computing device 122. The API modules 174 include any type that receives user-supplied content from the user. For example, the API modules 174 include a keyboard for receiving alpha-numeric text information from the user, a microphone for receiving audio content from the user, and/or a camera for receiving photographic or video content from the user.

Figure 2:
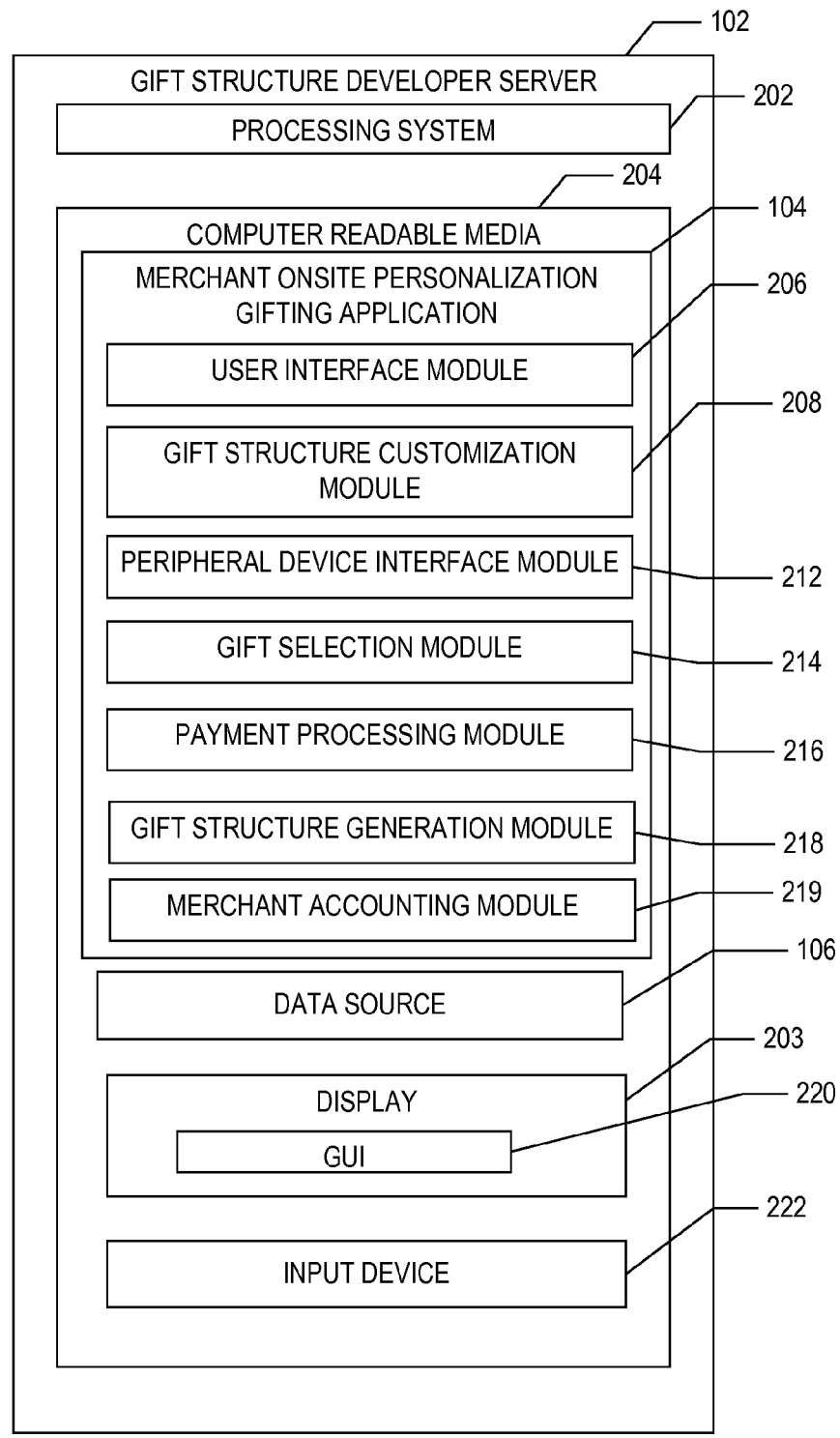
FIG. 2 is a block diagram of a computing system that includes a merchant onsite personalization gifting system according to an aspect of the merchant onsite personalization gifting system.

FIG. 2 is a block diagram depicting an example merchant onsite personalization gifting application 104 executed on the gift structure developer server 102. According to one aspect, the gift structure developer server 102 includes a processing system 202 that includes one or more processors or other processing devices. A processor is hardware. According to another aspect, the gift structure developer server 102 also includes a display 203, such as a computer monitor, for displaying data and/or a graphical user interface (GUI) 220. The gift card developer server 102 also includes an input device 222, such as a keyboard or a pointing device (e.g., a mouse, trackball, pen, or touch screen) to enter data into or interact with the graphical user interface 220. Examples of such a server 102 include one or more servers, personal computers, mobile computers and/or other mobile devices, and other computing devices. The server 102 may communicate via wireless, wireline, and/or optical communications.

The gift structure developer server 102 includes a computer readable medium 204 configured with the merchant onsite personalization gifting application 104. The merchant onsite personalization gifting application 104 includes instructions or modules that are executable by the processing system 202 to generate a customized gift structure to be sent to a recipient. The computer readable medium 204 includes volatile media, nonvolatile media, removable media, non-removable media, and/or another available medium that can be accessed by the gift structure developer server 102. By way of example and not limitation, computer readable medium 204 comprises computer storage media and communication media. Computer storage media includes non-transient storage memory, volatile media, nonvolatile media, removable media, and/or non-removable media implemented in a method or technology for storage of information, such as computer readable instructions, data structures, program modules, or other data. Communication media embodies computer readable instructions, data structures, program modules, or other data and include an information delivery media or system.

A user interface module 206 facilitates the receipt of data and/or other communications from the user computing device 122. In one example, the user interface module 206 communicates with the website application 140 to provide renderable code (e.g., hypertext markup language (HTML) instructions) that may be forwarded by the website application 140 to the user computing device 122 for generating one or more interactive screens on a web browser executed on the user computing device 122. In another example, the user interface module 206 communicates with another type of application executed on the merchant server 108, such as one that interfaces with application software (i.e., a mobile app) executed on the user computing device 122, such as a wireless communication device or tablet computer, to provide one or more selectable fields, editing screens, and the like for receiving content and/or modifying pre-recorded content by the user (i.e., sender). In yet another example, the user interface module 206 facilitates communication with one or more peripheral devices 156 of the computing device 122 to receive user-supplied content to be included on the gift structure.

A gift structure customization module 208 receives personalized content from the merchant server 108, and provides for the customization of content, such as content received from the user interface module 206. For example, the gift structure customization module 208 receives personalized content generated by the user via the website application 140 and processes the received user-supplied content to generate customized content to be included in the gift structure. For another example, the gift structure customization module 208 receives, via the website application 140, user selection of a gift structure template including a particular design associated with a special occasion, which may be, for example, a birthday, wedding, or a holiday, such as Christmas, Easter, Thanksgiving, and the like.

The user-supplied content may also include selection of one or more instances of pre-recorded content stored in the pre-recorded content 114. Examples of pre-recorded content may include, for example, pre-recorded text information, pre-recorded audio information, pre-recorded image information, pre-recorded video information. In a particular embodiment, the pre-recorded content including a song or a portion of a pre-recorded song that is copyrighted and licensed by the owner of the copyrighted song. The gift structure customization module 208 may also modify existing content, such as pre-recorded content or other previously received content, based upon input received from the user computing system 122 via the website application 140. An example of modifying existing content includes modifying a received photograph using one or more photograph editing features that provides for cropping, color hue adjustment, brightness adjustment, sizing, and/or other features associated with manipulation of digital imagery.

A peripheral device interface module 212 communicates with the website application 140 to provide an interface to one or more peripheral devices of the computing device, such as a global positioning system (GPS) device, a camera, a microphone, and other device configured on the computing system 122. For example, the peripheral interface module 212 may communicate with the website application 140 to receive audio, still imagery, and/or video content using the microphone and/or camera configured on the computing device 122 to be included with the customized gift structure.

The gift selection module 214 communicates with the merchant application 104 to facilitate selection of a gift to be included with the gift structure. The gift may be any product or service provide by the merchant, such as a pre-paid cellular telephone service, a gift card, an event ticket, a music subscription, a bouquet of flowers, a box of cookies, a box of chocolates, a box of candy, a gift basket, and/or other physical items, such as clothing or other hardware items. In a particular embodiment, a gift may be selected that may be conveyed electronically (e.g., SMS message, e-mail message, etc.) such as, for example, an e-gift card, an event ticket, a music subscription. Using these types of gifts, the system generates an electronic gift structure and appends the gift electronic gift structure to be sent to a selected recipient.

In a particular example, a florist merchant provides a website for online ordering of flower bouquets. Upon placing of an online order for a bouquet of flowers, the florist website also provides for selection of a gift, such as a gift card to be included with the bouquet by accessing the gift selection module 214 via an API or other suitable interface to manage selection of the gift and conducting a transaction for payment of the gift to be included with the bouquet of flowers.

A payment processing module 216 communicates with a payment processing server, such as the financial account server 152, to transact a monetary transfer of funds from the user's financial account to a financial account of the merchant for payment of the gift structure and any gift to be associated with the card. In one example, the payment processing module 216 includes an application program interface (API) for coordinating a monetary transaction (e.g., online money transfer) through an e-commerce provider, such as PAYPAL™, online credit card systems, or other suitable third party financial clearing entity. In another embodiment, the payment processing module 214 communicates with the website application 140 to receive financial transaction information in which the financial transaction has been conducted by the merchant via the website application 140.

A gift structure generation module 218 communicates with the production facility 124 located at merchant site to facilitate the generation of the gift structure to be sent to the recipient. Once created, the gift structure and any selected gift are sent to the recipient via a mail delivery service, such as the UNITED PARCEL SERVICE™ (UPS).

A merchant accounting management module 219 manages payment by the merchant 108 for use of the merchant onsite personalization gifting platform. For example, the application 104 may monitor each time the merchant server 108 executes the application 104 for generating a customized gift structure and records this information in the merchant accounting information 116. On a periodic basis (e.g., once a month), the merchant accounting management module 219 may generate a message, such as an e-mail message or conventional mail message, that includes an itemized list of all gift structures generated during that time period along with a bill for the services rendered. The merchant accounting management module 219 may also support varied billing plans, such as discounted royalties for generation of certain types of gift structure templates.

It should be appreciated that the modules described herein are provided only as examples that executes the merchant onsite personalization gifting application 104 according to the teachings of the present disclosure, and that other computing systems may have the same modules, different modules, additional modules, or fewer modules than those described herein. For example, one or more modules as described in FIG. 2 is combined into a single module. As another example, certain modules described herein is encoded on, and executed on other computing systems, such as the computing device 122 used by the user. For another example, the modules described herein may include services, such as those conforming to the WSDL protocol that may be used by the website application 140 for selecting, customizing, and generating a gift structure to be sent to a recipient.

Figure 3:
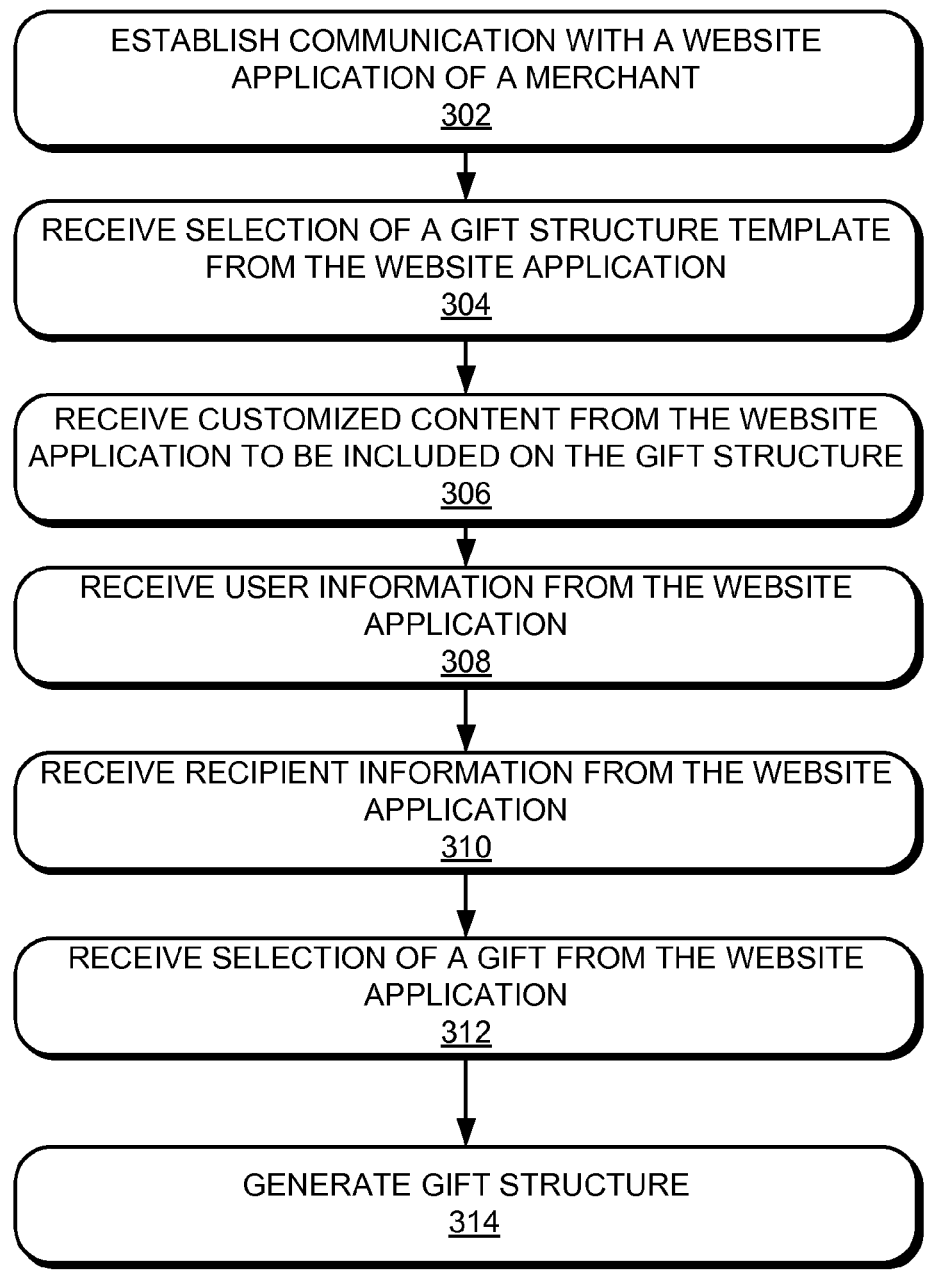
FIG. 3 is a flowchart depicting a process for creating a personalized gift structure according to an aspect of the merchant onsite personalization gifting system.

FIG. 3 illustrates an example process that is performed by the merchant onsite personalization gifting application 104 according to the teachings of the present disclosure.

In step 302, the merchant onsite personalization gifting application 104 establishes communication with a website application 140 owned and managed by a merchant 110. The website application 140 may include a typical website used by the merchant and accessible via the Internet by the user computing device 122 using a web browser. In another embodiment, the merchant server 108 may include another application for communicating with a mobile app that is executed on a tablet computer or mobile phone.

Figure 4:
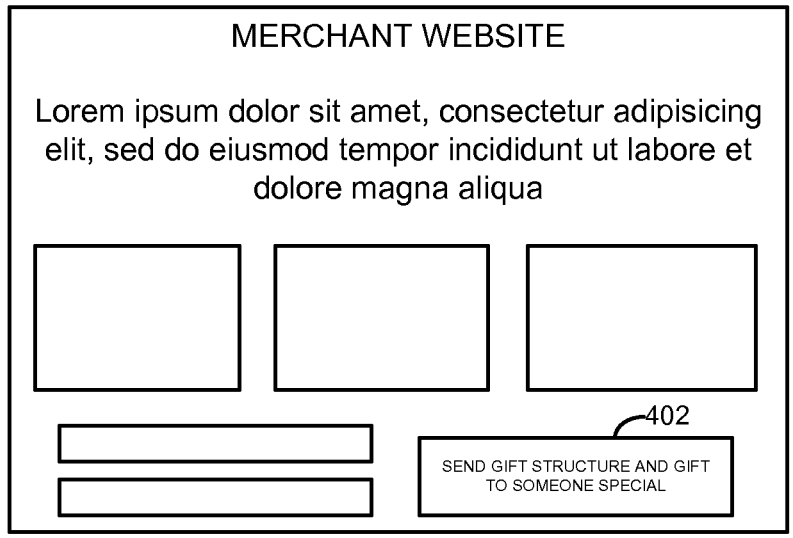
FIG. 4 illustrates an example of a merchant website according to an aspect of the merchant onsite personalization gifting system.

The user accesses the system 100 via the user interface of the user computing device 122 hosted by the website application 140. A user may arrive at the system interface via an HTML link or other suitable entry point, such as through a mobile app executed on a portable computing device. For example, the website application 140 may generate a screen (FIG. 4) that includes a hypertext link 402 from which the gift structure generation process may be initiated. Alternatively, the user may launch a mobile app on a portable computing device, such as a wireless communication device or portable tablet computer from which the GUI is generated on the computing device 122.

Figure 5:
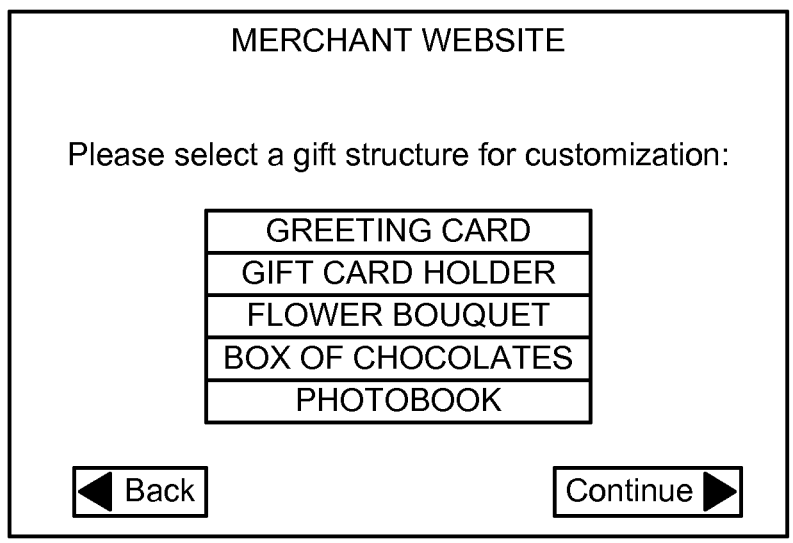
FIG. 5 illustrates an example of an occasion selection page of a user interface according to an aspect of the merchant onsite personalization gifting system.
Figure 6:
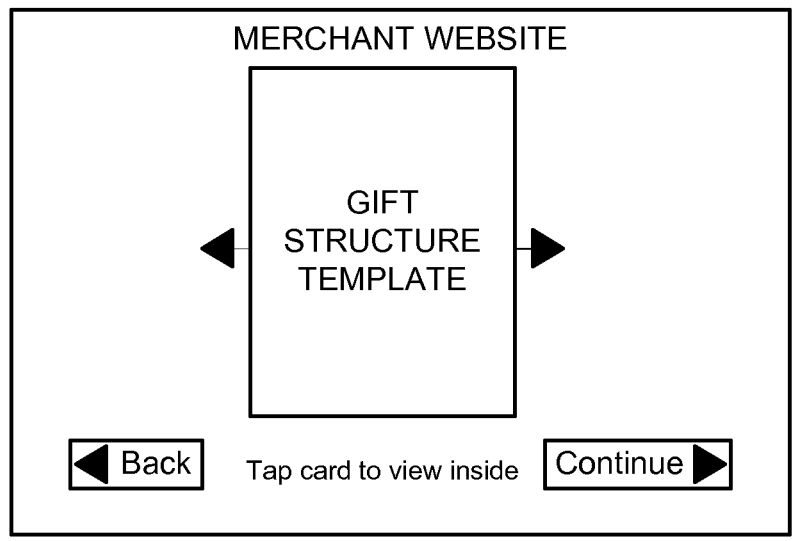
FIG. 6 illustrates an example of a gift structure selection screen according to an aspect of the merchant onsite personalization gifting system.

In step 304, the application 104 communicates with the website application 140 to receive selection of a gift structure template from the user computing device 122. For example, the merchant onsite personalization gifting application 104 communicates with the website application 140 to present an occasion selection screen (FIG. 5) for entry of a particular occasion by the user computing device 122. As another example, the merchant onsite personalization gifting application 104 communicates with the website application 140 to present a gift structure selection screen (FIG. 6) for selection of a particular gift structure template by the computing device 122. For a particular example in which the selected occasion is Christmas, the merchant onsite personalization gifting application 104 presents multiple gift structure templates that alternatively include a Christmas tree, a manger scene, three wise men on a desert journey, and the like. In response, the user, via the computing device 122, selects one particular gift structure template for further customization.

Figure 7:
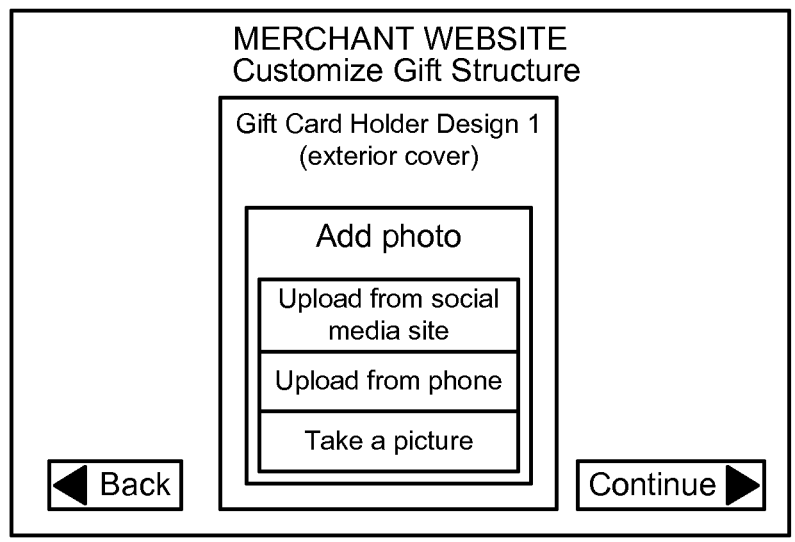
FIG. 7 illustrates an example of an interactive screen according to an aspect of the merchant onsite personalization gifting system.
Figure 8:
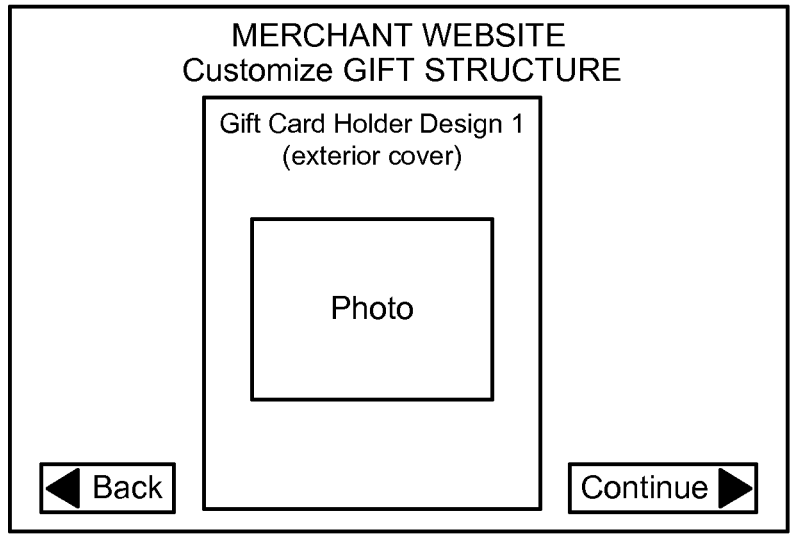
FIG. 8 illustrates an example of a gift structure display screen according to an aspect of the merchant onsite personalization gifting system.
Figure 9:
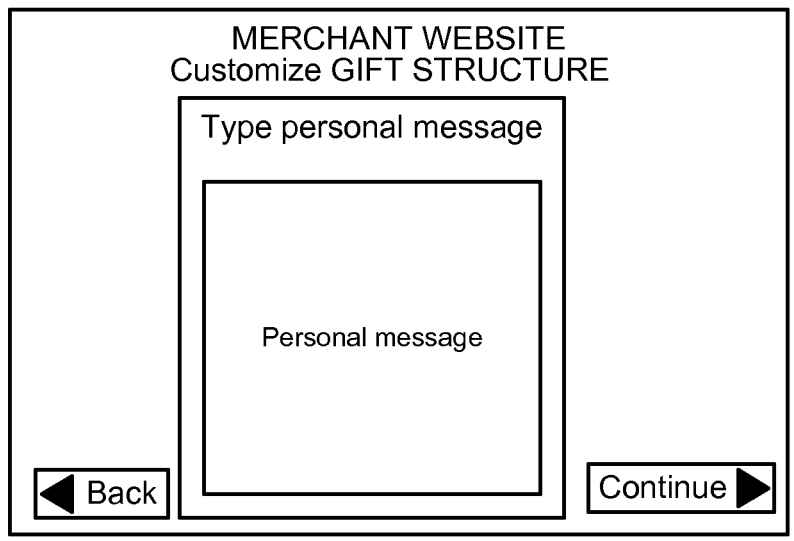
FIG. 9 illustrates an example of personal message entry screen according to an aspect of the merchant onsite personalization gifting system.
Figure 10:
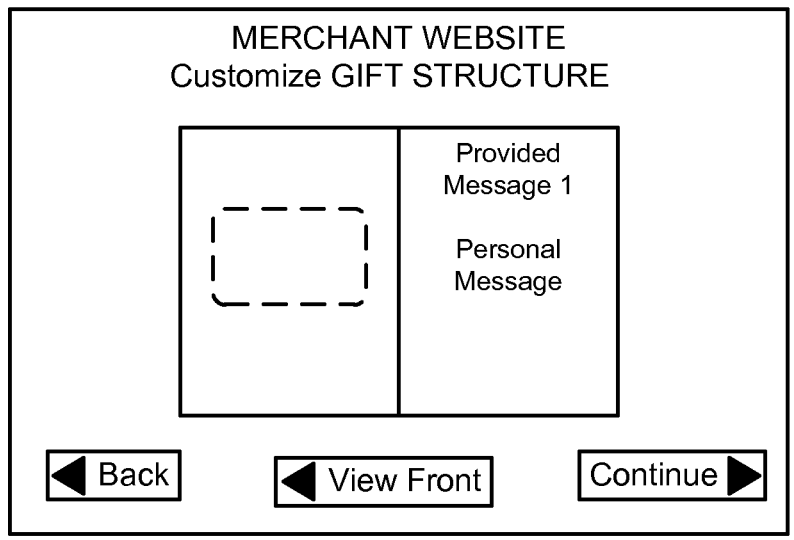
FIG. 10 illustrates an example of a preview screen according to an aspect of the merchant onsite personalization gifting system.

In step 306, the merchant onsite personalization gifting application 104 communicates with the website application 140 to receive customized content from the user computing device 122. For example, the merchant onsite personalization gifting application 104 presents an interactive screen (FIG. 7) to receive selection of a photograph from either a social media website, from the phone on which the GUI is displayed, or from a camera configured on the phone. It should be understood herein that the merchant onsite personalization gifting application 104 uploads content from any suitable computing device 122 on which the GUI is displayed, such as a workstation, notebook computer, personal digital assistant, or tablet computer. As another example, the merchant onsite personalization gifting application 104 also displays the selected photograph on a portion of the gift structure (FIG. 8) and provides for editing of the photograph using typical editing techniques such as cropping, color hue adjustment, and the like. As another example, the merchant onsite personalization gifting application 104 presents a personal message entry screen (FIG. 9) that allows for the entry of a text message by the user computing device 122. Once any photographs and/or text messages are received from the user computing device 122, the merchant onsite personalization gifting application 104 displays a preview screen (FIG. 10) to show how the gift structure will look.

Figure 11:
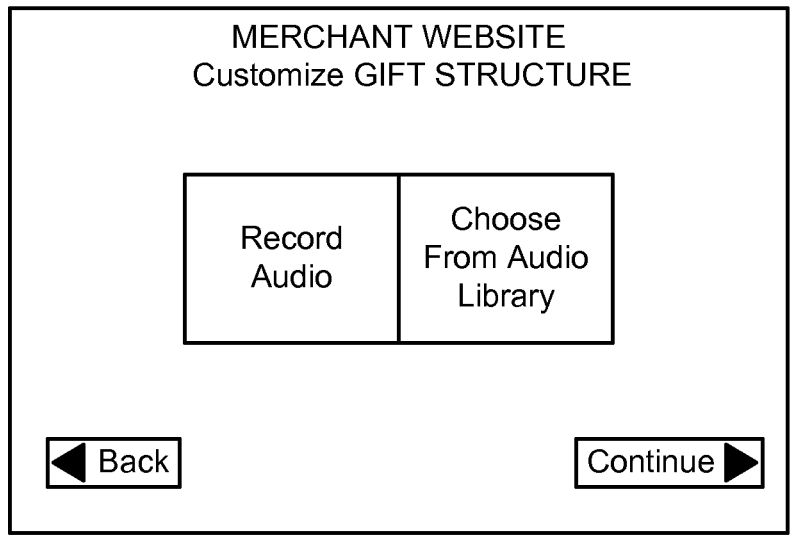
FIG. 11 illustrates an example of an audio selection screen according to an aspect of the merchant onsite personalization gifting system.
Figure 12:
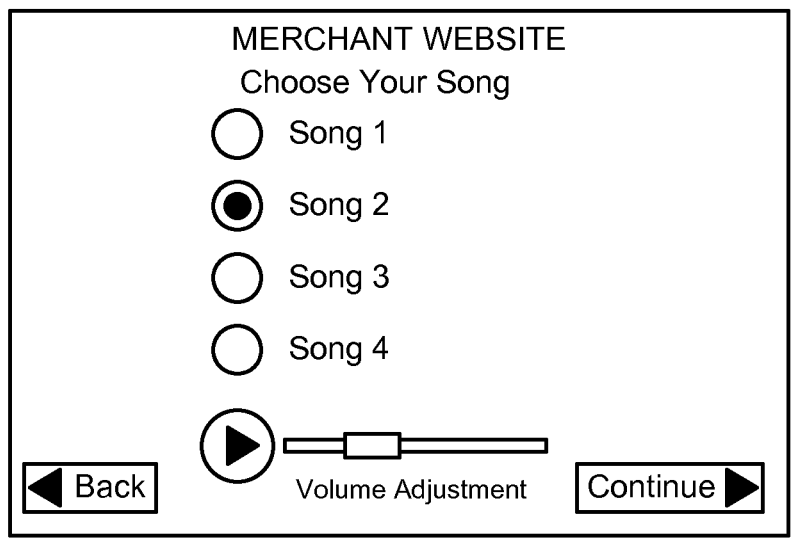
FIG. 12 illustrates an example of another audio selection screen according to an aspect of the merchant onsite personalization gifting system.
Figure 13:
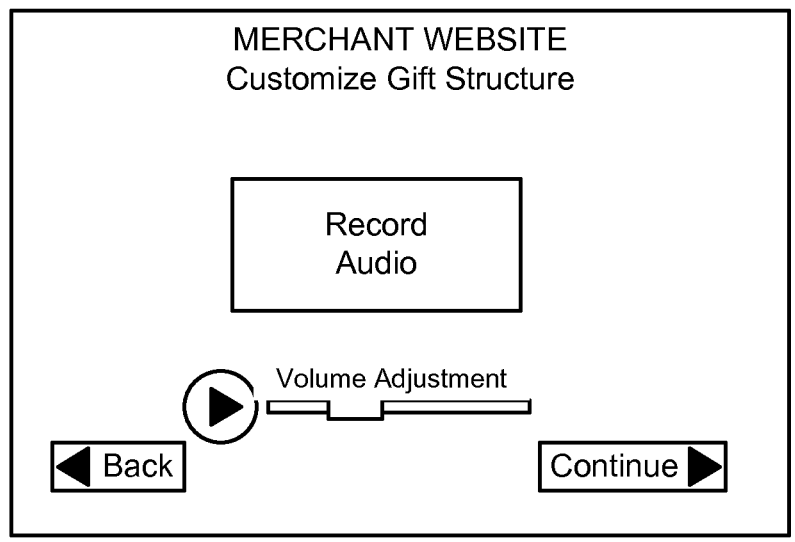
FIG. 13 illustrates an example of audio generation screen according to an aspect of the merchant onsite personalization gifting system.
Figure 14:
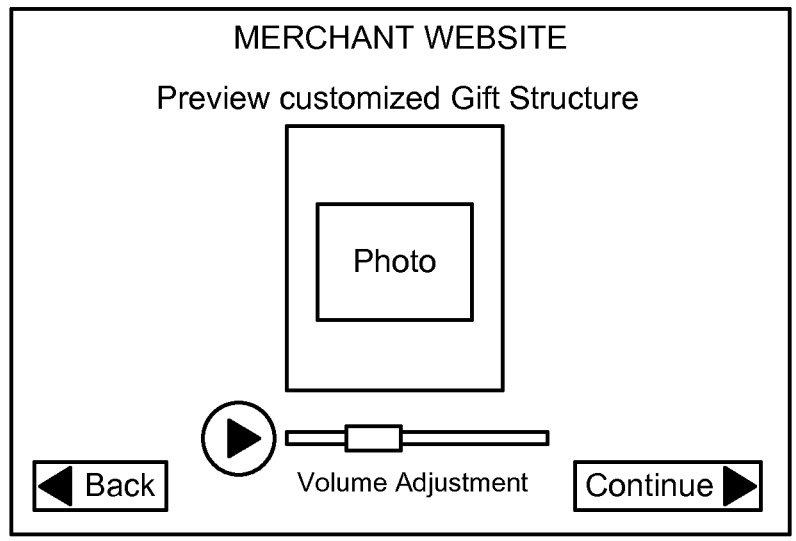
FIG. 14 illustrates an example of preview screen according to an aspect of the merchant onsite personalization gifting system.

According to one embodiment, the merchant onsite personalization gifting application 104 provides for selection or creation of audio content for the gift structure by the user. The merchant onsite personalization gifting application 104 presents an audio selection screen (FIG. 11) that allows the user to either select a pre-recorded audio segment or create an audio segment, such as an audio file stored in 'mp3' or 'wav' format. If the merchant onsite personalization gifting application 104 receives selection of a pre-recorded audio segment, an audio selection screen (FIG. 12) is generated that allows for selection of a particular audio file by the user computing device 122. However, if the merchant onsite personalization gifting application 104 receives selection of an audio creation, an audio generation screen (FIG. 13) is generated to receive an audio segment from the computing device 122. In one embodiment, the GUI has access to the API associated with the microphone of the computing device 122 such that the audio segment is obtained directly from the microphone of the computing device 122. Although not shown, the merchant onsite personalization gifting application 104 also place or receive a plain old telephone service (POTS) phone call to receive audio content to be included with the gift structure. Additionally, the merchant onsite personalization gifting application 104 can upload a previously recorded audio file from the computing device 122 for inclusion with the gift structure. The merchant onsite personalization gifting application 104 displays a preview screen (FIG. 14) in which the selected audio segment is played along with any previously selected video and/or text content.

Figure 15:
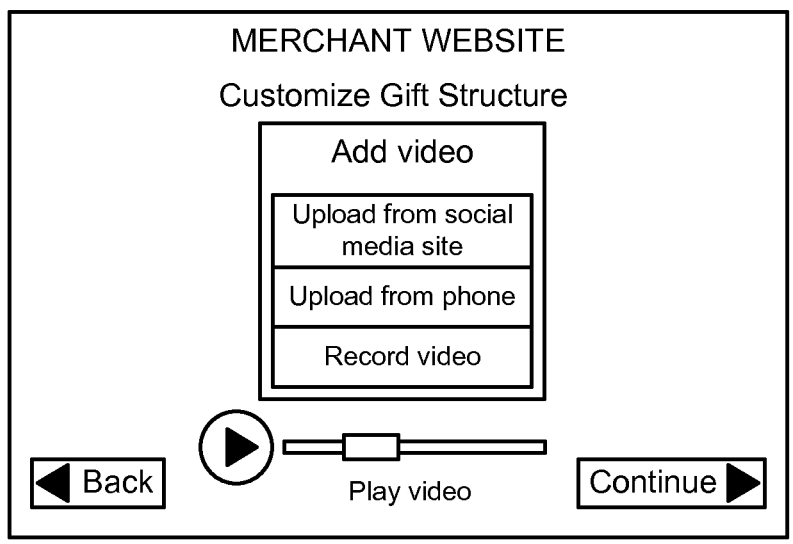
FIG. 15 illustrates an example of a video selection screen according to an aspect of the merchant onsite personalization gifting system.

According to another embodiment, the merchant onsite personalization gifting application 104 provides for addition of video content for the gift structure. The video content is included with the gift structure as a computer readable medium, such as a USB memory stick, a CD disk, a DVD disk, and may also include multimedia playing capability that allows the recipient to hear and/or view the stored video content from the gift structure. To provide video content, the merchant onsite personalization gifting application 104 presents a video selection screen (FIG. 15) that allows the user to either upload a video segment from a social media website, upload an existing, previously recorded video segment, or record a video segment. Each template includes a structure, such as the recording time, screen density, and any textual or graphic embellishments that is displayed along with the teaser video segment. If recording of a video segment is selected, a video generation screen (FIG. 15) is generated to receive a video segment from the computing device 122. In one embodiment, the GUI has access to the API associated with the camera of the computing device 122 such that the video segment is obtained directly from the camera of the computing device 122.

In step 308, the merchant onsite personalization gifting application 104 communicates with the website application 140 to obtain user information. For example, the merchant onsite personalization gifting application 104 communicates with the website application 140 to generate a sign-in screen (FIG. 16) on the user computing device 122. In the event that the user has not yet established an account, the merchant onsite personalization gifting application 104 communicates with the website application 140 to generate a registration screen (FIG. 17) on the user computing device for registration of the user. In other embodiments, information associated with the user without the sign-in screen, and registration screen as shown in FIGS. 16 and 17, respectively if registration of the user is not needed or desired.

In step 310, the merchant onsite personalization gifting application 104 communicates with the website application 140 to receive information associated with a recipient. For example, the merchant onsite personalization gifting application 104 communicates with the website application 140 to generate a recipient information screen (FIG. 18) to receive one or more identifying elements of the recipient from the user. The merchant onsite personalization gifting application 104 also communicates with the website application 140 to generate a second recipient information screen (FIG. 19) to receive one or more other elements of information of the recipient, such as a location where the recipient resides, an age of the recipient, and any interests of the recipient. It is important to note that FIGS. 18 and 19 merely show one embodiment of recipient information that is received by the merchant onsite personalization gifting application 104; other examples however, provide for receipt of any type of recipient information. Alternatively, the merchant onsite personalization gifting application 104 obtains personal information of the recipient using one or more social network sites, such as FACEBOOK™. As will be described in detail below, the merchant onsite personalization gifting application 104 uses this information to provide targeted suggestions to the user for designing the gift structure and/or selection of a gift card.

Certain embodiments of the system 100 provide a technique for a user to view and select social media contacts (e.g. FACEBOOK™ friends) via social media APIs that provide contact information and demographics that the system utilizes to provide gifting recommendations to the user. The system, for example, provides the user with a listing of all contact birthdays within a specified or system-determined period of time (e.g. 30 days), and allows the user to select a contact from the list and then proceed with creating a personalized gift via the system as described herein below.

Figure 20:
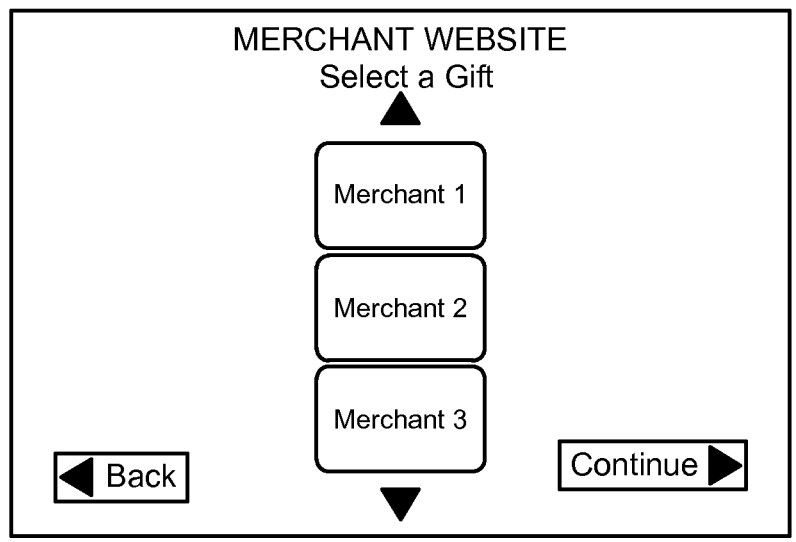
FIG. 20 illustrates an example of a gift selection screen according to an aspect of the merchant onsite personalization gifting system.
Figure 21:
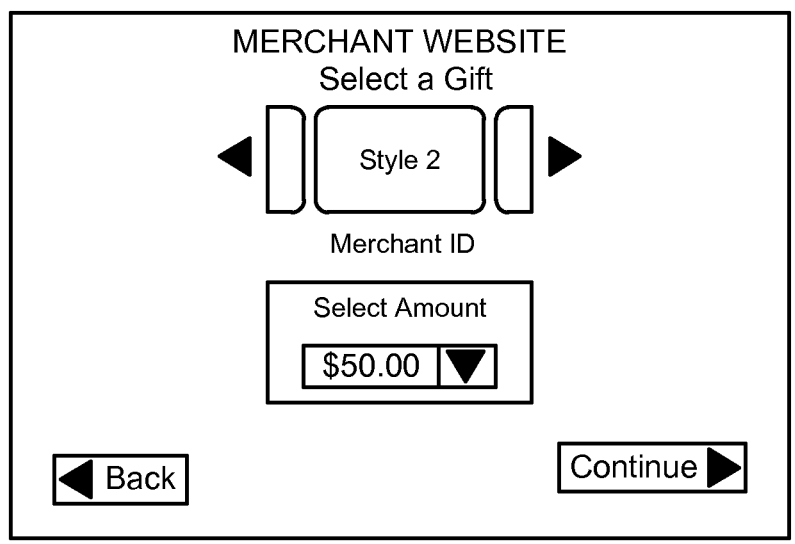
FIG. 21 illustrates an example of a gift card selection screen according to an aspect of the merchant onsite personalization gifting system.

In step 312, the merchant onsite personalization gifting application 104 communicates with the website application 140 to receive selection of a gift to accompany the gift structure designed and personalized in steps 302 through 308. For example, the merchant onsite personalization gifting application 104 communicates with the website application 140 to generate a gift selection screen (FIG. 20) that allows the user to select one or more gifts to accompany the personalized gift structure. In one embodiment, the merchant onsite personalization gifting application 104 uses personal information obtained from one or more social media outlets to generate a suggested list of merchants from which to choose. For example, if personal information associated with the recipient indicates that the recipient enjoys automobile racing, the merchant onsite personalization gifting application 104 aggregates gifts available from the merchant related to racing equipment or other automobile equipment, such as aftermarket automobile parts, automobile service centers, and the like. In one embodiment, the application 104 may also enable selection of a gift card to accompany the customized gift structure. As such, the application 104 communicates with the website application 140 to generate a gift card selection screen (FIG. 21) that allows the user to enter a particular style of gift card and a monetary amount for the gift card. The style of the gift card includes one of multiple background images that are to be displayed on the card.

Certain embodiments of the system provide a mechanism to use the system 100 for charitable giving by providing an option for the user to select a gift card as a means for a charitable donation. The recipient receives the card, selects a charity, and the selected charity receives a donation per the value of the card. The system of the present invention is used to provide enhancements to the charitable gifting experience, both for the user and the recipient, such as by means of personalized gift structures including graphic, text, audio and/or video content, and by sending the recipient a video teaser in advance of receipt of the gift card.

In step 314, the merchant onsite personalization gifting application 104 generates a gift structure in accordance with information provided by the user computing device in steps 302 through 310. To generate the gift structure, the merchant onsite personalization gifting application 104 communicates with the production facility located at the merchant site for generating the gift structure/gift card combination in physical form. That is, the merchant onsite personalization gifting application 104 transmits the information associated with the gift structure/gift card combination to a production facility whereby a gift structure (FIGS. 22A and 22B) is fabricated using conventional printing techniques on a physical medium, such a paper cardstock, plastic sheet, parchment, or other suitable print media. Thereafter, the merchant may then have the gift structure and any associated gifts sent to the recipient via a suitable mail delivery service.

The process described above may be repeatedly performed to generate additional gift structures to be sent to one or more recipients. When use of the merchant onsite personalization gifting application 104 is no longer needed or desired, the process ends.

It should be appreciated that the steps described herein are provided only as an example of a process that is performed by the merchant onsite personalization gifting application 104 according to the teachings of the present invention, and that the merchant onsite personalization gifting application 104 may perform fewer, more, or different types of steps than those described herein. For example, the merchant onsite personalization gifting application 104 performs multiple steps described above as a single step. As another example, certain steps described herein is performed by other components of the merchant onsite personalization gifting system 100, such as by the user computing device 122 owned by the user.

Figure 22A:
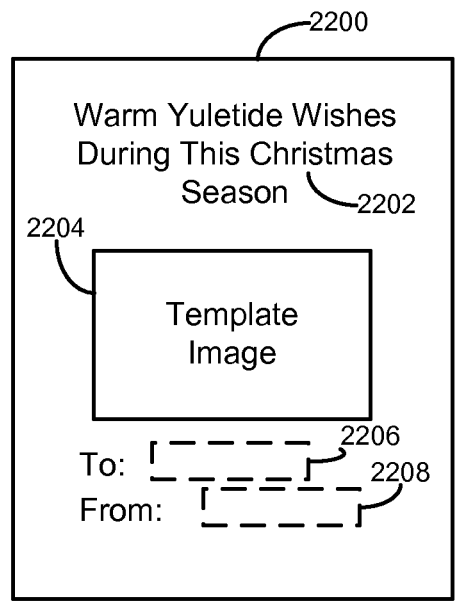
FIGS. 22A and 22B illustrate an example gift structure/gift card combinations that is generated by the merchant onsite personalization gifting system according to an aspect of the present disclosure.
Figure 22B:
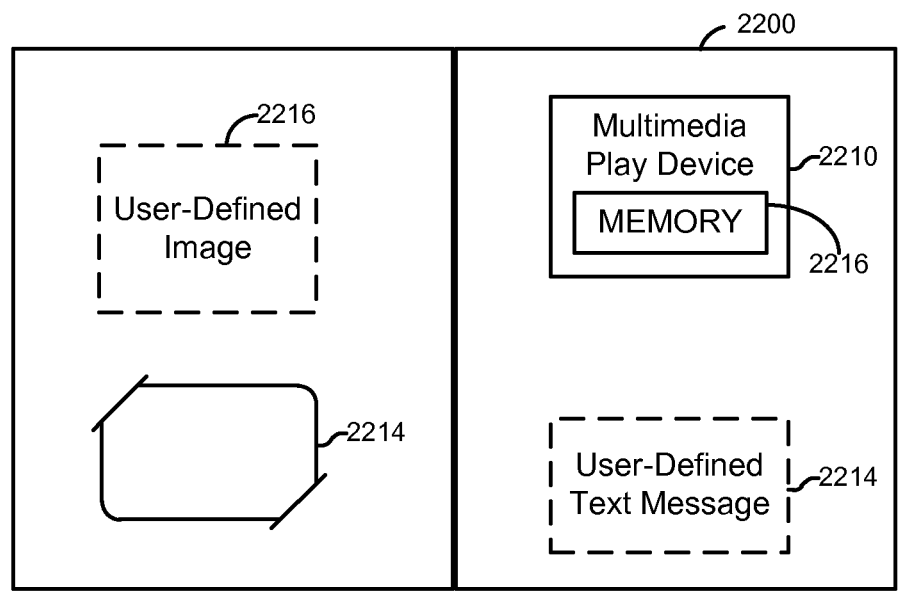

FIGS. 22A and 22B illustrate an example gift structure that is generated by the merchant onsite personalization gifting system 100. The particular gift structure 2200 shown is a greeting card; however, it should be appreciated that the gift structure 2200 may be any structure that may be personalized with user-supplied content. Examples of such structures include, but are not limited to, gift card holders, flower bouquets, chocolate boxes, photobooks, and the like. As shown, the gift structure 2200 includes a greeting card shown in a closed position (FIG. 22A) and an open position (FIG. 22B), respectively, according to embodiments of the present disclosure.

As shown in FIG. 22A, the gift structure 2200 includes a stock template message 2202 and a template image 2204 that are included as part of the selected gift structure template 112. Nevertheless, the message 2202 and template 2204 may be modified or replaced by some other content if desired by the user. For example, the user may modify the included stock message 2202 to only include the text 'Warm Yuletide Wishes.' Additionally, the template image 2204 may be modified to be larger, smaller, or replaced with another image of the user's choosing. The gift structure 2200 also includes one or more customized text messages 2206 and 2208 indicating whom the holder is from, whom the holder is addressed to, or other messages to be conveyed to the recipient.

As best shown in FIG. 22B, the gift structure 2200 also includes a multimedia play device 2210 that is configured to play content stored in a memory 2212. For example, the memory 2212 may store imagery, audio files, and/or video files as described above. In other embodiments, only a computer readable memory is provided, such that, upon receipt, the recipient may view imagery or play the audio/video files on a suitable playback device, such as a personal computer.

The gift structure 2200 includes a gift card 2214 and a customized user-defined image 2216 that is printed on the inside flap of the gift structure 2200.

FIGS. 22A and 22B merely show an example of a physical gift structure/gift combinations that is provided by the merchant onsite personalization gifting application 104, other examples includes different combinations of components. For example, the gift structure 2200 may only include printable imagery such as printed images of text information if audio and/or video content is not needed or desired. Additionally, the customized messages, optional gifts, multimedia play device, or images are arranged on the gift structure in any suitable manner and in any suitable orientation with respect to one another.

Those skilled in the art will appreciate that variations from the specific embodiments disclosed above are contemplated by the invention. The invention should not be restricted to the above embodiments, but should be measured by the following claims.

What is claimed is:

1. An outsourced online personalized gifting system to provide seamless personalization to a merchant commerce website, the system comprising:

a gift structure developer server comprising at least one processor and at least one memory unit to create one or more personalized gift structure templates from one or more stock gift structure templates associated with a merchant and having one or more user-supplied content fields, the gift structure developer server configured to:

transmit the one or more stock gift structure templates to a merchant server, managed by the merchant, wherein the merchant server is further in communication with a user computing device through a merchant website;

wherein the merchant server provides a gift, and is separate and distinct from the gift structure development server, which is managed by a developer that provides the gift structure templates;

receive from the merchant server a selected one gift structure template that has been selected at the merchant server by a user of the user computing device through one or more interfaces of a merchant application;

receive from the merchant server at least one of user-supplied photographic or video content that has been obtained by the merchant server from the user computing device through one or more interfaces of the merchant application, where the merchant application further transmits the user-supplied photographic or video content to the gift structure developer server in response to an application program interface (API) request originating at the user computing device, wherein the video content is received via a video generation screen, wherein the video content is included in a video template including a recording time and a screen density;

wherein the user-supplied photographic or video content is obtained from the user computing device through one or more interfaces accessing at least one of a built-in data collection device, an external data collection device, an internal storage, and an external storage;

receive from the merchant server user-supplied content in the form of audio from a telephone service;

receive, from the merchant server, a selection of a gift to be sent to the recipient along with the gift structure and a playback device, the gift comprising a product or service provided by the merchant, wherein the playback device is configured to access the user-supplied content; and create the one or more personalized gift structure templates that include instructions and the user-supplied content for the manufacture of a personalized gift structure, wherein creating the one or more personalized gift structure templates includes storing the user-supplied audio, photographic, or video content in a memory of the gift structure developer server and editing the user-supplied audio, photographic, or video content to fit the parameters of at least one field of the template;

wherein the one or more personalized gift structure templates of the edited user-supplied content are retrieved by a computing device at a production facility, located at a site of the merchant where the production facility manufactures the personalized gift structure using the user-supplied content as composited in the user-supplied content fields of the selected gift structure template, wherein the gift structure developer server provides differing billing plans based upon a type of the gift structure template used by the merchant server, wherein the gift structure developer server further provides, on a periodic basis, an itemized list of the gift structure templates including a bill for services rendered, and wherein in response to a request from the one or more application program interface (API) modules, the gift development server provides for display of the merchant commerce website at the user computing device, such that communication of the user computing device with the gift structure developer server is transparent to the user.

2. The online personalized gifting system of claim 1, wherein the one or more gifts comprise at least one of a gift card, an event ticket, a music subscription, a bouquet of flowers, a box of cookies, a box of chocolates, a box of candy, and a gift basket.

3. The online personalized gifting system of claim 1, wherein the gift structure developer server inserts merchant advertising content into the personalized gift structure.

4. The online personalized gifting system of claim 1, wherein user-supplied content includes at least one of audio and video content stored in a computer readable medium, the computer readable medium being included in the personalized gift structure.

5. The online personalized gifting system of claim 4, further comprising a multimedia play device coupled to the computer readable medium for playing the stored content.

6. The online personalized gifting system of claim 1, wherein the gift structure developer server monitors the merchant server to record a usage value, where the usage value is incremented for each gift structure generated by the merchant server, and where the gift structure developer server stores the recorded usage value in a computer readable medium.

7. The online personalized gifting system of claim 1, wherein the user computing device comprises a wireless communication device that executes a mobile app to communicate with the merchant server.

8. The online personalized gifting system of claim 1, wherein the user computing device comprises a personal computing device that executes a web browser to communicate with the merchant server.

9. The online personalized gifting system of claim 1, wherein the stock gift structure comprises at least one of a greeting card, a gift card holder, a flower bouquet, a chocolate box, a photo book, and a gift box.

10. The online personalized gifting system of claim 1, wherein the gift structure developer server receives payment data for the gift structure purchase.

11. The online personalized gifting system of claim 1, wherein the external storage device is a USB memory stick.

12. An outsourced gift structure ordering method to provide seamless personalization to a merchant commerce website, the method comprising:

transmitting, using at least one processor that executes an application stored in a memory, a plurality of stock gift structure templates to a merchant server, associated with a merchant, wherein the merchant server is further in communication with a user computing device, each stock gift structure template having one or more user-supplied content fields for inclusion of user-supplied content, wherein the merchant server, which is managed by a merchant that provides a gift, is separate and distinct from a gift structure development server, which is managed by a developer that provides the stock gift structure templates;

receiving, through the application, from the merchant server a selected one gift structure template that has been selected at the user computing device through one or more interfaces of the merchant application, wherein the selected one gift structure template is selected from a list of suggested gift structure templates and is based at least in part on information indicative of the recipient;

receiving, through the application, from the merchant server at least one of user-supplied photographic or video content that has been obtained by the merchant server from the user computing device through one or more interfaces of the merchant application, where the merchant application transmits the user-supplied photographic or video content to the gift structure developer server in response to an application program interface (API) requesting originating at the user computing device, receiving, through the application, from the merchant server user-supplied content in the form of audio from a telephone service;

creating one or more personalized gift structure templates that include instructions and the user-supplied content for the manufacture of a personalized gift structure, wherein creating the one or more personalized gift structure templates includes storing the user-supplied audio, photographic, or video content in a memory of the gift structure developer server and editing the user-supplied audio, photographic, or video content to fit the parameters of at least one field of the template;

receiving, through the application, from the merchant server a selection of a gift to be sent to the recipient along with the gift structure and a playback device, the gift comprising a product or service sold by the merchant, wherein the playback device is configured to access the user-supplied content, making available to a production facility, the edited user-supplied content in the user-supplied content fields of the personalized gift structure template;

making available to the production facility, recipient data to facilitate transferal of the gift structure and the selected gift to a recipient selected by the user computing device via one or more interfaces of the merchant application, and providing, by the gift structure developer server, differing billing plans based upon a type of the gift structure template used by the merchant server; and wherein in response to a request from the one or more application program interface (API) modules, the gift development server provides for display of the merchant commerce website at the user computing device, such that communication of the user computing device with the gift structure developer server is transparent to the user.

13. The method of claim 12, further comprising communicating with the production facility for including merchant advertising content on the gift structure.

14. The method of claim 12, further comprising facilitating burning of at least one instance of the user-supplied content to a computer readable medium, the at least one instance including at least one of audio and video content.

15. The method of claim 12, further comprising communicating with the merchant server for determining, recording, and storing a usage value in a computer readable medium, where the usage value is incremented for each gift structure generated by the merchant server.

16. The method of claim 12, wherein the user computing device comprises a wireless communication device that executes a mobile app to communicate with the merchant server.

17. The method of claim 12, wherein the user computing device comprises a personal computing device that executes a web browser to communicate with the merchant server.

18. The method of claim 12, wherein the information indicative of the recipient is information obtained online.

19. An online personalized gifting system comprising:

a gift structure developer server comprising at least one processor and at least one memory unit to store one or more stock gift structure templates each having one or more user-supplied content fields, the gift structure developer server configured to:

transmit the stock gift structure templates to a merchant server, associated with a merchant, wherein the merchant server is further in communication with a user computing device; wherein the merchant server, which is managed by a merchant that provides a gift, is separate and distinct from the gift structure development server, which is managed by a developer that provides the gift structure templates;

communicate with the merchant server to receive a selected stock gift structure template that has been selected at the merchant server by a user of the user computing device through one or more interfaces of the merchant application;

communicate with the merchant server to receive at least one of user-supplied textual, audio, photographic, or video content that has been obtained by the merchant server from the user computing device through one or more interfaces of the merchant application, where the merchant application transmits the user-supplied audio, photographic, or video content to the gift structure developer server in response to an application program interface (API) request originating at the user computing device, wherein the video content is received via a video generation screen, wherein the video content is included in a video template including a recording time and a screen density;

communicate with the merchant server to receive a selection of a gift to be sent to the recipient along with the gift structure and a playback device, the gift comprising a product or service provided by the merchant, wherein the playback device is configured to access the user-supplied content, wherein the user-supplied content is sent in an external storage;

wherein the merchant providing the gift is selected from a list of merchants determined at least in part based on information related to the recipient;

provide a production facility located at a site of the merchant a personalized gift structure in accordance with the selected gift structure template and the user-supplied content;

the production facility configured to include the user-supplied content in the user-supplied content fields of the gift structure template, and facilitate transfer of the personalized gift structure and the selected gift to a recipient selected by the user computing device, wherein the gift structure developer server provides differing billing plans based upon a type of the gift structure template used by the merchant server, wherein the gift structure developer server further provides, on a periodic basis, an itemized list of the gift structure templates including a bill for services rendered, and wherein in response to a request from the one or more application program interface (API) modules, the gift development server provides for display of a merchant commerce website at the user computing device, such that communication of the user computing device with the gift structure developer server is transparent to the user.

20. The online personalized gifting system of claim 19, wherein the information related to the recipient is obtained from an online social media account.

\* \* \* \* \*